United States Patent [11] 3,612,811

[72] Inventors Viktor Senderovich Lifshits
Kavkazsky bulvar, 21, korpus 2, kv. 41, Moscow;
Violetta Pavlovna Guseva, 13 Parkovaya, 16, korpus 4, kv. 57, Moscow; Vadim Petrovich Krivonos, ulitsa Repina, 13, kv. 1, Kiev; Nikolai Vasilievich Podola, ulitsa Pushkinskaya, 8, kv. 12, Kiev; Alexandr Semenovich Falkevich, deceased, late of Moscow; Valentina Pavlovna Falkevich, administrator, 5 Parkovaya ulitsa, 52, kv. 31, Moscow of said Alexandr Semenovich Falkevich, deceased; Sergei Alexandrovich Falkevich, administrator, Golyanovo, korpus 46, kv. 75, Moscow of said Alexandr Semenovich Falkevich, deceased; Boris Alexandrovich Falkevich, administrator, 5 Parkovaya ulitsa, 52, kv. 31, Moscow, all of U.S.S.R. of said Alexandr Semenovich Falkevich, deceased
[21] Appl. No. 821,166
[22] Filed Apr. 25, 1969
[45] Patented Oct. 12, 1971

[54] METHOD OF THE ELECTRIC BUTT WELDING OF WORKPIECES
1 Claim, 1 Drawing Fig.
[52] U.S. Cl. ..................................... 219/100, 219/97, 219/104
[51] Int. Cl. ....................................... B23k 11/02
[50] Field of Search ............................ 219/104, 110, 117, 97, 100

[56] References Cited
UNITED STATES PATENTS
| | | | |
|---|---|---|---|
| 2,508,330 | 5/1950 | Callender et al. | 219/110 |
| 2,980,789 | 4/1961 | Vang | 219/110 X |
| 3,068,350 | 12/1962 | Archer | 219/110 |
| 3,335,257 | 8/1967 | Sakharnor et al. | 219/97 X |
| 3,388,116 | 12/1967 | Noble | 219/110 |

Primary Examiner—J. V. Truhe
Assistant Examiner—L. A. Schutzman
Attorney—Waters, Roditi, Schwartz & Nissen ABSTRACT: A method of effecting electrical butt welding of workpieces by continuously flashing the ends of the workpieces to be welded to a temperature within 0.7 to 1.0 of the melting point of the workpiece material and with a variation during the welding process of the flashing rate followed by upsetting; the extremal value of the power evolving in the workpieces to be welded being maintained in the course of the flashing process, whereas upsetting is effected to a value responsive to the distance between sections of the workpieces at a predetermined heating temperature depending on the properties of the workpiece material. An apparatus for carrying into effect the said method comprises a welding machine and a device for controlling the processes of flashing and upsetting, provided with two channels for controlling the welding process.

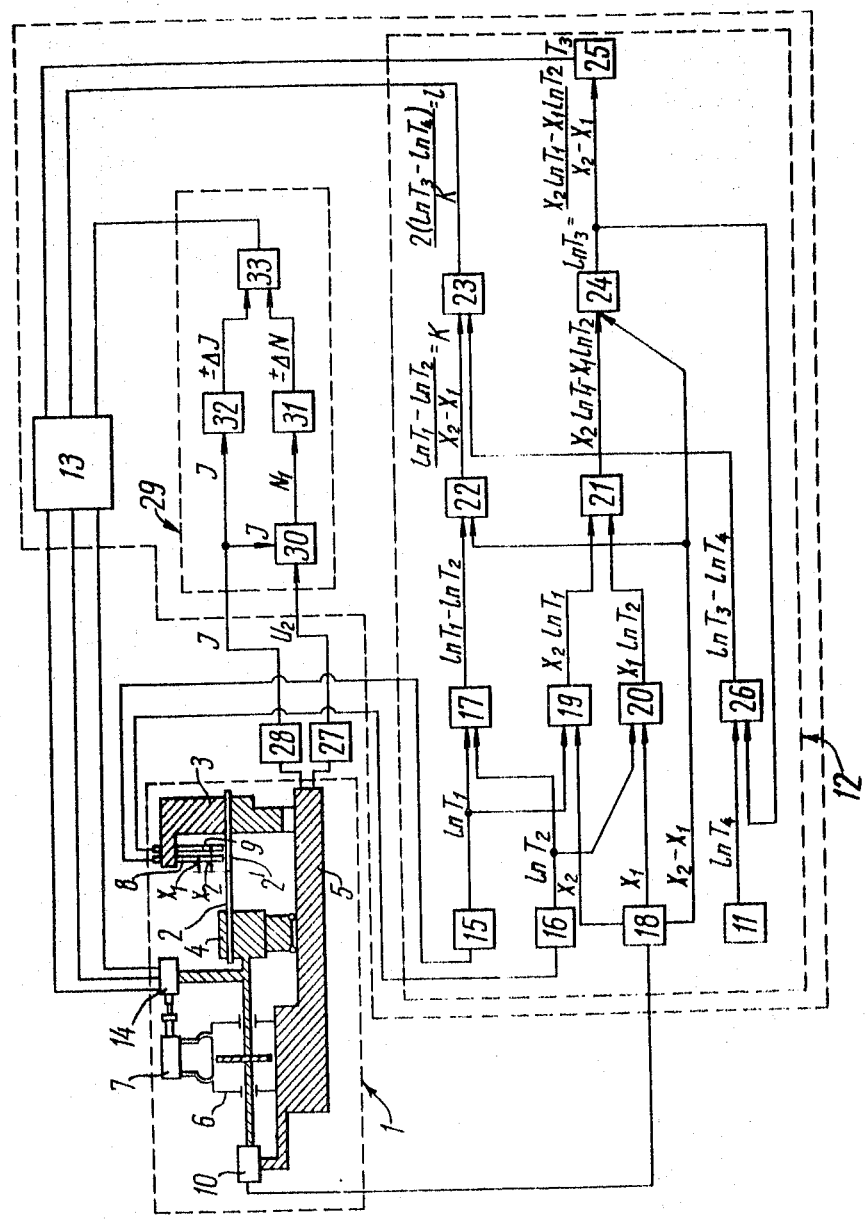

METHOD OF THE ELECTRIC BUTT WELDING OF WORKPIECES

The present invention relates to a method for the electric butt welding of workpieces and to an apparatus for effecting same. It may be employed for welding pipes, sheets, rails, and other solid and hollow workpieces.

Known in the prior art are methods for the electric butt welding of workpieces featuring continuous flashing with the flashing rate varying in the course of the welding process, followed by an upsetting operation. Known also are apparatus for effecting methods of electric butt welding.

When the prior art methods are employed for making a high-quality welded joint, optimum welding conditions are preliminarily determined proceeding by the trial-and-error method, the industrial welding of workpieces being started only thereafter. The optimum welding conditions are understood to be an interrelationship between such technological characteristics as the secondary voltage of a welding transformer, displacement of the workpieces during their flashing, rate of flashing, current frequency, rate and valve of upsetting, and other parameters. It is obvious that a welded joint of good quality can be obtained in the same workpieces under various optimum welding conditions.

The experimentally established optimum welding conditions are adhered to through prior art apparatus controlling the flashing and upsetting processes by means of program devices, for example, program cams.

Since quality of a welded joint depends on correct interrelationship between the above said parameters, a variation of one of them without a corresponding variation in the other characteristics, is likely to produce a welded joint of poor quality. It is also necessary to take into account that in the course of the welding process, the value of secondary voltage, the total resistance of a transformer, the quality level of preparation of the workpieces for welding, and the like parameters may vary. Thus, under conditions of usual variations of the welding characteristics, the program cams intended for carrying into effect the experimentally found welding conditions, cannot ensure the provision of a welded joint of good quality.

That is why the prior art method of electric butt welding of workpieces and an apparatus for effecting same require great expense and labor for determining the optimum and efficient welding conditions, and do not ensure the provision of a welded joint of good quality, which is especially important due to a lack of control methods that do not require destruction of welded joints made according to the method of electric butt welding.

It is the primary object of the invention to develop such a method of the electric butt welding of workpieces, and to provide such an apparatus for effecting same, which would permit a welded joint of good quality in the workpieces to be made even if the welding parameters and operation characteristics of the welding apparatus vary in the course of the welding process.

Another object of the present invention is to reduce costs as required for determining the optimum conditions of the welding process.

In conformity with the above said other objects, the essential feature of the present invention consists in that the electric butt welding of workpieces featuring continuous flashing with a variation in the fusion rate during the welding process and the subsequent upsetting operation, are carried on, according to the invention, up to the moment when on the entire surface of the ends to be flashed there is obtained a temperature varying within a range of 0.7 to 1.0 of the melting point of a material the workpieces to be welded are made of, and in the course of the flashing process the extreme value of the power is maintained, evolving in the workpieces to be welded, as a function of current flowing through the primary circuit of a welding transformer owing to a variation in the fusion rate, whereas the upsetting operation is effected to an extent being equal to the distance between the sections of the workpieces preheated up to a specified heating temperature, which is determined by the properties of the materials the workpieces to the welded are made of.

In the apparatus for effecting electric butt welding, comprising a welding apparatus and a device for controlling the flashing and upsetting operations, according to the invention, the device for controlling the flashing and upsetting processes is provided with two channels for controlling the welding process, one of which comprises at least two temperature pickups disposed at various distances from the fusing ends of the workpieces to be welded, a positioning pickup measuring instantaneous variations in original distances of each of the temperature pickups from the ends to be flashed, a unit for presetting the temperature of sections, the distance between which equals the value of upsetting, and a computer device for determining current values of the temperature of the ends to be flashed and the upsetting value, and connected to the inputs thereof are the temperature and positioning pickups, as well as a unit for presetting temperature, and the output thereof is connected to an actuator mechanism for moving the workpieces during the upsetting process, whereas the second controlling channel comprises instruments for measuring voltage and current, as well as a unit for controlling the extreme value of the power evolving in the workpieces to be welded, and to the inputs thereof is connected the said measuring instruments, whereas the output thereof is connected to an actuator intended for moving the workpieces in the course of the flashing process.

The nature of the present invention will become more fully apparent from a consideration of the following description thereof, taken in conjunction with the accompanying drawing showing a structural diagram of the apparatus intended for carrying into effect the electric butt welding according to the invention.

The apparatus for the electric butt welding of workpieces comprises a welding machine 1 and a device for controlling the flashing and upsetting operations, having two channels for controlling the welding process. Workpieces 2 and 2' to be welded are secured one in a stationary fixture 3 and another in a movable fixture 4, which are both provided on a body 5 of the welding machine 1. The movable fixture 4 is moved by an actuator designed as a hydraulic cylinder 6 complete with a followup slide valve 7.

The first channel for controlling the welding process comprises two temperature pickups 8 and 9 which are disposed at the distances $X_1$ and $X_2$ specified before welding and varying in the welding process from the flashing ends of workpieces 2 and $2^1$ to be welded; a positioning pickup 10 for the said temperature pickups 8 and 9 with regard to the ends being flashed during the welding process, and a unit 11 for presetting temperature $T_4$ of the sections, the spacing therebetween being equal to the upsetting value 1. The pickups 8 and 9 for measuring temperatures $T_1$ and $T_2$ in two sections at the specified distances $X_1$ and $X_2$, and the unit 11 for presetting temperature $T_4$ are connected to the inputs of a computer device 12 for determining current values of temperature $T_3$ of the ends to be flashed and the upsetting value 1. The outputs of the computer device 12 are connected to units 13 and 14 for converting electrical signals into mechanical ones, actuating the followup slide valve 7 of the actuator for moving the workpieces 2 and 2'.

In the computer device 12 for determining the current values of temperature of the ends to be fused $T_3$ and the upsetting value, a system of equations is to be solved: $=(k1/2)$ $$T_4 = T_3 e$$
$$T_1 = T_3 e^{1kx_1}$$
$$T_2 = T_3 e^{1kx_2}$$

where $k$ is the damping factor; and $e$ is the base of the natural logarithm.

The computer device is provided with two nonlinearity blocks 15 and 16, the inputs of which are connected to the temperature pickups 8 and 9, whereas the outputs are connected to a summing device 17. The input of the voltage block 13 proportional to original distances $X_1$ and $X_2$ of the pickups 8 and 9 from the ends to be flashed, and to the difference of these distances from the ends to be fused ($X_2-X_1$), is connected to the positioning pickup 10. Multiplying blocks 19 and 20 are connected with their inputs to blocks 15, 16 and 18, whereas their outputs are connected to the summing device 21.

Moreover, the computer device 12 comprises multiplying blocks 22, 23 and 24, and the nonlinearity block 25. The unit 11 for presetting the temperature of the sections, the distance between which being equal to the upsetting value, is connected to the input of the summing device 26, the input of which is connected to the input of the multiplying block 23, whereas the second input, to the output of block 24. The input of block 22 is connected to the outputs of blocks 17 and 18, whereas its output, to the second input of block 23.

The inputs of block 24 are connected to the outputs of the summing device 21 and block 18, whereas its output is connected to the summing device 26 and block 25. The outputs of blocks 23 and 25 are connected to converters 13 and 14.

The second channel for controlling a regulator comprises measuring instruments 27 and 28 for measuring voltage and current, respectively, and block 29 for controlling the extremal value of the power evolving in workpieces 2 and $2^1$ to be welded, to the outputs of which the said measuring instruments 27 and 28 are connected, whereas its output is connected to converters 13 and 14 acting on the actuator 6 for moving the workpieces in the course of the upsetting process.

Block 29 for controlling the extremal values comprises a power pickup 30, the inputs of which are connected to measuring instruments 27 and 28, whereas its output is connected to an accumulating or storing device 31. The block 29 comprises also the second accumulating or storing unit 32, the input of which is connected to measuring instrument 28, and a logical element 33. Two inputs of the logical element 33 are connected to the accumulating units 31 and 32, whereas its output is connected to converters 13 and 14 engaging the actuator 6 for moving the workpieces in the course of flashing.

The apparatus for effecting the electric butt welding operates as described below.

Prior to welding, a ratio is predetermined between the level of power $N_1$ evolving in the workpieces to be welded in the course of the flashing process, and power $N_2$ of the supply source. For example, a problem is proposed for maintaining in the flashing process the extremal value of power $N_1$ evolving in the workpieces to be welded as a function of current I flowing through the primary circuit of the welding transformer. In addition to the above said, there is predetermined a temperature $T_3$ of the ends to be flashed, at which a signal should be sent for upsetting; for instance, the temperature of the ends to be flashed is predetermined, and is numerically equal to the melting point of a material the workpieces to be welded are made of; and temperature $T_4$ of sections of the workpieces is predetermined, the spacing therebetween being equal to the upsetting value. For example, for structural carbon steels at the upsetting rate of 30 mm./sec. and the temperature at the surfaces to be flashed prior to upsetting, equal to 1,520° C., temperature $T_4$ varies within a range of 1,100° 1,150° C.

Then is selected the value of secondary voltage $U_2$ to be supplied on the workpieces to be welded, and the original flashing rate Vo is predetermined.

In the process of flashing, supplied from measuring instruments 27 and 28 of electrical parameters to the input of block 29 for controlling the extremal value of power, are current values of power $N_1$ evolving in the workpieces to be welded, and of current I.

In accumulating or storing devices 31 and 32, there is measured the difference "$\Delta N$ and $\Delta I$" between the current values of the characteristic to be measured, and its value stored during the foregoing cycle.

Signals corresponding to $\Delta N_1$ and $\Delta J$ are supplied into logical element 33 of block 29 for controlling the extremal value of power depending on the relation of signs of the increments $\Delta N$ and $\Delta I$, and according to logic put into block 29 for controlling the extremal values of power, a signal is sent to converters 13 and 14, which, in their turn, vary through the actuator the rate of flashing in compliance with the following algorithm:

I.    $\Delta N,>0$    $V_{n+1}=V_n+\Delta V$
     $\Delta J>0$

II.   $\Delta N,>0$    $V_{n+1}=V_n+\Delta V$
     $\Delta J<0$

III.   $\Delta N,>0$    $V_{n+1}=V_n-\Delta V$
     $\Delta J<0$

IV.   $\Delta N,<0$    $V_{n+1}=V_n-\Delta V$
     $\Delta J>0$    where $V_{n+1}$ is the instantaneous flashing rate;

$V_n$ is a preceding value of the flashing rate; and $\Delta V$ is the value of a variation in the fusion rate. The instantaneous rate V of flashing therefore varies in proportion to the absolute value of an increase in power evolving in the workpieces to be welded.

In the process of flashing there occurs the heating of the workpieces to be welded. Supplied from the pickups 8 and 9 the signal is converted into electrical signals to be sent to the input of computer device 12. Simultaneously with signals corresponding to the temperature in two sections found at various distances $X_1$ and $X_2$ from the ends to be flashed, signals from block 18 are supplied to blocks 19, 20, 22 and 24, the signals being proportional to the spacing of these sections from the ends to be flashed, and to the difference of these spacings ($X_2-X_1$). Support in the beginning from block 18 to blocks 19, 20, 22 and 24 are signals proportional to the original distances from these sections to the ends, and to the difference between these distances, and then to the current values of distances $X_1$ and $X_2$ and to their difference ($X_2-X_1$). For supplying a signal corresponding to varying original distances $X_1$ and $X_2$ of the sections, in which temperature is measured, sent from the ends to be flashed, to the input of block 18, is a signal from the positioning pickup 10 proportional to half of the flashed value. For this purpose the pickup 10 is connected to a movable fixture 4 of the welding machine 1.

In addition to the above said signals, applied to the input of summing device 26 from block 11 into the computer device 12 is a voltage proportional to the predetermined temperature of the sections, the spacing therebetween corresponding to the upsetting value.

In the course of the flashing process, the computer device 12 solves the above said system of three equations with three unknown factors according to the predetermined and current data, emitting at the output signals that are proportional to the current values of temperature $T_3$ of the ends to be flashed and to the upsetting value 1. The said signals are supplied into converters 13 and 14.

On reaching the specified temperature on the ends to be flashed, for example, temperature which is numerically equal to the melting point of a material the workpieces to be welded are made of, the converters 13 and 14 operate and send a signal for starting the upsetting operation to actuator 6, thus completely opening slide valve 7. The upsetting value calculated at this moment is stored up by the converters 13 and 14, and is sent as a command to the actuator 6 limiting the upsetting value. On reaching the calculated value of upsetting, the slide valve 7 is closed. In such a manner the device carries into effect the welding method and ensures the optimum welding conditions permitting a welded joint of good quality to be produced.

To establish the efficient conditions for welding the specified workpieces, the welding process is carried into effect with different values of secondary voltages of the welding machine or on different machines without varying the parameters $T_3$ and $T_4$ being preset. The efficient welding conditions are considered to be those which cause the minimum consumption of materials.

As it will become apparent from the above, the apparatus allows the welded joint of good quality to be produced under varying welding conditions characteristics of the welding machine and geometrical dimensions of the workpieces to be welded. When passing over into the welding of workpieces made of other materials, it is necessary to vary two parameters by predetermining: temperature $T_3$ of the ends to be flashed prior to carrying out the upsetting operation and temperature $T_4$ of sections, the distance between which corresponding to the upsetting value.

In contradistinction to the existing welding methods, the proposed method of welding allows a welded joint of good quality to be produced under varying welding conditions. This is rendered possible owing to the fact that the characteristics selected as preset parameters for controlling values $N_1/N_2$, $T_3$ and $T_4$ are independent of the welding parameters and characteristics of the welding machines and dimensions of the workpieces to be welded. Selection of the efficient conditions of the proposed welding process consists in determining consumption rates for the welding process when carrying out the welding process at various values of the secondary voltage.

Hence, the volume of experimental work, i.e., the number of test joints, as required for determining the efficient conditions, of welding, corresponds to the number of steps of controlling the secondary voltage of the welding transformer. The most important advantage of the proposed welding method consists in that it allows the control of the quality of the welded joints to be replaced by the control of dependability of the instruments controlling the welding process.

Another advantage of the proposed welding method (in case of its being used under field conditions) consists in the possibility of achieving the specified characteristics of the welding process with a relatively low specific consumption of power to be spent in the flashing process, equaling, for example, 0.5 to 0.7 kWt/cm.$^2$

What we claim is:

1. A method of electrically butt welding workpieces with a welding transformer having a primary circuit, said method comprising heating the surface of the ends of the workpieces to be welded to a temperature within a range of 0.7 to 1.0 of the melting point of the workpiece material through continuous flashing of the ends of the workpieces, measuring the power evolving in the workpieces to be welded, maintaining in the process of flashing the extremal value of the said power as a function of current flowing through the primary circuit of said transformer by varying the flashing rate, and upsetting the workpieces to be welded by a value equal to the distance between sections of the workpieces, at a preset heating temperature which is determined by properties of the workpiece material.

UNITED STATES PATENT OFFICE
CERTIFICATE OF CORRECTION

Patent No. 3,612,811  Dated October 12, 1971

Inventor(s) Viktor Senderovich Lifshits, et al.

It is certified that error appears in the above-identified patent and that said Letters Patent are hereby corrected as shown below:

Column 2, line 75, "13" should read -- 18 --.
Column 3, line 46, "I" to -- J --; line 67, "I" to -- J --; line 69, "$\Delta I$" to -- $\Delta J$ --; line 75, " $\Delta N$" to -- $\Delta N_1$ --; same line " $\Delta L$" to -- $\Delta J$ --.

Signed and sealed this 1st day of October 1974.

(SEAL)
Attest:

McCOY M. GIBSON JR.
Attesting Officer

C. MARSHALL DANN
Commissioner of Patents